(12) United States Patent
Ngo et al.

(10) Patent No.: US 12,226,904 B2
(45) Date of Patent: Feb. 18, 2025

(54) ROBOT DEVICE, METHOD FOR THE COMPUTER-IMPLEMENTED TRAINING OF A ROBOT CONTROL MODEL, AND METHOD FOR CONTROLLING A ROBOT DEVICE

(71) Applicant: Robert Bosch GmbH, Stuttgart (DE)

(72) Inventors: Anh Vien Ngo, Nehren (DE);
Alexander Kuss, Schoenaich (DE);
Hanna Ziesche, Leonberg (DE);
Miroslav Gabriel, Munich (DE);
Philipp Christian Schillinger, Renningen (DE); Zohar Feldman, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 366 days.

(21) Appl. No.: 17/893,596

(22) Filed: Aug. 23, 2022

(65) Prior Publication Data
US 2023/0063799 A1 Mar. 2, 2023

(30) Foreign Application Priority Data
Sep. 2, 2021 (DE) .................... 10 2021 209 646.8

(51) Int. Cl.
*B25J 9/16* (2006.01)
*G06T 7/10* (2017.01)

(52) U.S. Cl.
CPC .............. *B25J 9/163* (2013.01); *B25J 9/161* (2013.01); *B25J 9/1612* (2013.01); *B25J 9/1697* (2013.01); *G06T 7/10* (2017.01)

(58) Field of Classification Search
CPC . B25J 9/163; B25J 9/161; B25J 9/1612; B25J 9/1697; G06T 7/10; G05B 2219/40515
See application file for complete search history.

(56) References Cited

U.S. PATENT DOCUMENTS 6,747,649 B1* 6/2004 Sanz-Pastor ............ G06T 17/00
345/428
11,554,482 B2* 1/2023 Chen ...................... B25J 9/1671
(Continued)

FOREIGN PATENT DOCUMENTS

DE 202017106506 U1 4/2018
DE 102017108727 A1 10/2018
(Continued)

OTHER PUBLICATIONS

Mahler et al., "DEX-NET 2.0: Deep Learning to Plan Robust Grasps With Synthetic Point Clouds and Analytic Grasp Metrics," Cornell University, 2017, pp. 1-12.
(Continued)

*Primary Examiner* — Harry Y Oh
(74) *Attorney, Agent, or Firm* — NORTON ROSE FULBRIGHT US LLP; Gerard A. Messina

(57) ABSTRACT

A robot device, a method for training a robot control model, and a method for controlling a robot device. The method for training includes: supplying an image showing object(s), to a first and second prediction model to produce a first and second pickup prediction that has, for each pixel of the image, a first and second pickup robot configuration vector with an assigned first and second success probability; supplying the first and second pickup prediction to a blending model of the robot control model to produce a third pickup prediction that has, for each pixel of the image: a third pickup robot configuration vector that is a weighted combination of the first and second pickup robot configuration vector, and a third success probability that is a weighted combination of the first and second success probability; and training the robot control model by adapting the first and second weighting factors.

14 Claims, 9 Drawing Sheets

(56) References Cited

U.S. PATENT DOCUMENTS

2021/0331311 A1* 10/2021 Fu .................. G06V 10/764
2022/0016765 A1* 1/2022 Ku .................. G05B 19/4155

FOREIGN PATENT DOCUMENTS

| DE | 102018215826 A1 | 3/2019 |
| DE | 102018000730 B4 | 10/2019 |
| DE | 112017007311 T5 | 12/2019 |
| DE | 102019122790 A1 | 2/2020 |
| DE | 102019205651 B3 | 8/2020 |
| DE | 102016015873 B3 | 10/2020 |
| DE | 102018215057 B4 | 12/2020 |
| DE | 102020128653 A1 | 5/2021 |

OTHER PUBLICATIONS

Zeng et al., "Learning Synergies Between Pushing and Grasping With Self-Supervised Deep Reinforcement Learning," Cornell University, 2018, pp. 1-9.

Berscheid et al., "Robot Learning of Shifting Objects for Grasping in Cluttered Environments," Cornell University, 2019, pp. 1-7.

Morrison et al., "Learning Robust, Real-Time, Reactive Robotic Grasping," The International Journal of Robotics Research, vol. 39, No. 2-3, 2020, pp. 183-201.

Satish et al., "On-Policy Dataset Synthesis for Learning Robot Grasping Policies Using Fully Convolutional Deep Networks," IEEE Robotics and Automation Letters, vol. 4, No. 2, 2019, pp. 1357-1364.

* cited by examiner

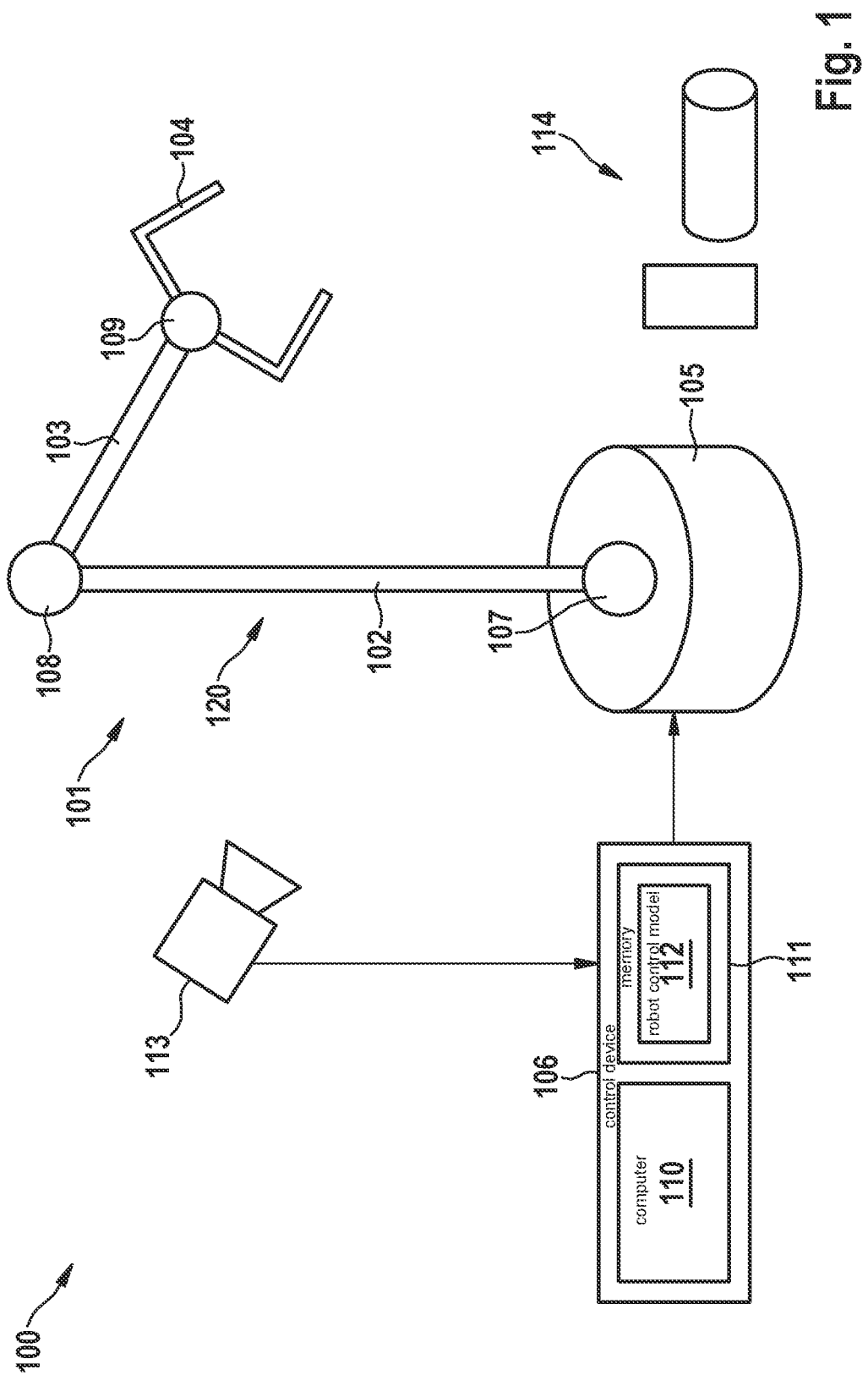

ROBOT DEVICE, METHOD FOR THE COMPUTER-IMPLEMENTED TRAINING OF A ROBOT CONTROL MODEL, AND METHOD FOR CONTROLLING A ROBOT DEVICE

CROSS REFERENCE

The present application claims the benefit under 35 U.S.C. § 119 of German Patent Application No. DE 10 2021 209 646.8 filed on Sep. 2, 2021, which is expressly incorporated herein by reference in its entirety.

FIELD

Various exemplary embodiments of the present invention relate in general to a robot device, to a method for the computer-implemented training of a robot control model, and to a method for controlling a robot device.

BACKGROUND INFORMATION

Robot devices can be used for example in manufacturing, in production, in maintenance, in the household, in medical technology, etc. Such robot devices can for example pick up and move objects. In this context, a robot control model can ascertain which object of a plurality of objects the robot device is to pick up, and how the robot device is to pick up and move the object (e.g. using one or more robot arms).

In this regard, various conventional models ascertain an object to be picked up and the associated configuration of the robot device on the basis of an image that shows the plurality of objects.

The paper "Dex-net 2.0: Deep learning to plan robust grasps with synthetic point clouds and analytic grasp metrics" by J. Mahler et al., arXiv:1703.09312, 2017, (hereinafter referred to as reference [1]) describes a model (Dexterity Network, Dex-Net) that, on the basis of a depth image showing multiple objects, ascertains a grasping configuration of a robot arm in order to grasp an object of the plurality of objects.

The paper "Learning Synergies between Pushing and Grasping with Self-supervised Deep Reinforcement Learning" by A. Zeng et al., arXiv:1803.09956, 2018 (hereinafter referred to as reference [2]) describes a model that, on the basis of a depth image showing multiple objects, ascertains grasping configurations of a robot arm and associated success probabilities for each.

The paper "Robot Learning of Shifting Objects for Grasping in Cluttered Environments" by L. Berscheid et al, arXiv:1907.11035, 2019 (hereinafter referred to as reference [3]) describes a model that, on the basis of a depth image showing multiple objects, ascertains grasping configurations of a robot arm.

The paper "Learning robust, real-time, reactive robotic grasping" by D. Morrison et al., *The International Journal of Robotics Research,* 2020, (hereinafter referred to as reference [4]) describes a model that, on the basis of a depth image showing multiple objects, ascertains grasping configurations of a robot arm.

The paper "On-policy dataset synthesis for learning robot grasping policies using fully convolutional deep networks" by V. Satish et al., *IEEE Robotics and Automation Letters,* 2019 (hereafter referred to as reference [5]) describes a model that, on the basis of a depth image showing multiple objects, ascertains grasping configurations of a robot arm using a convolutional neural network.

However, the quality of each individual model is a function of various factors, such as a similarity between input data and training data, a suitability of the respective training method for various object classes of objects to be picked up, a sensitivity with respect to an input noise in the processed images and/or with respect to artefacts, etc. Each model provides the best results for the conditions assumed in the model. Each model is a function of the respective hyperparameter search and the training data preparation. For example, reference [4] relies on densely labeled ground truth images. For example, reference [5] relies on synthetic data production, which is an approximation of real physics. To summarize, the models have advantages and disadvantages depending on the application. Images recorded during robot operation may be different from the training data and may be unpredictable, so that it cannot be predicted which model will yield the best results.

SUMMARY

The method (first and eleventh example) and the devices (fourteenth and fifteenth example) make it possible to improve a successful picking up of an object by a robot device. Here, the probability that an object will be successfully picked up (e.g., not dropped) by the robot device is increased. An improved robot control model is clearly presented.

A robot device can be any type of computer-controlled device, such as a robot (e.g. a manufacturing robot, a maintenance robot, a household robot, a medical robot, etc.), a vehicle (e.g. an autonomous vehicle), a household device, a production machine, a personal assistant, an access control system, etc.

The method having the features of a first example include: a method for the computer-implemented training of a robot control model, set up to control a robot device for picking up an object of one or a plurality of objects, the method including:
  supplying an image, which shows the one or more objects, to a first prediction model of the robot control model in order to produce a first pickup prediction that includes, for each pixel of the image, a respective first pickup robot configuration vector that describes a configuration of the robot device, with an associated first predicted success probability;
  supplying the image to a second prediction model of the robot control model in order to produce a second pickup prediction, which includes, for each pixel of the image, a respective second pickup robot configuration vector that describes a configuration of the robot device), with an associated second predicted success probability;
  supplying the first pickup prediction and the second pickup prediction to a blending model of the robot control model in order to produce a third pickup prediction, which, for each pixel of the image:
    includes a third pickup robot configuration vector that is a combination, weighted by first weighting factors, of the first pickup robot configuration vector and the second pickup robot configuration vector, and
    includes a third predicted success probability that is a combination, weighted by second weighting factors, of the first predicted success probability and the second predicted success probability; and
  training the robot control model by adapting the first weighting factors and the second weighting factors on the basis of target data in which a successful picking up is assigned to at least one pixel of the image, in such a way that the third predicted success probability produced for the at least one pixel is increased.

As can be seen, the robot control model trained according to the first example selects the most trustworthy robot configuration from a plurality of prediction models. The robot control model described herein has weighting factors that weight the robot configurations predicted by different prediction models, thus taking into account the advantages and disadvantages of the respective prediction model.

The first weighting factors can include a weighting factor for all first pickup robot configurations and a weighting factor for all second pickup robot configurations. The features described in this paragraph, in combination with the first example, form a second example. A weighting factor for all pixels of the image can reduce the computing outlay for adapting the first weighting factors.

The first weighting factors can include a respective weighting factor for each first pickup robot configuration vector, and a respective weighting factor for each second pickup robot configuration vector. The features described in this paragraph, in combination with the first example, form a third example. A pixel-wise first weighting matrix can increase the accuracy and flexibility of the trained blending model.

The second weighting factors can include a weighting factor for all first predicted success probabilities and a weighting factor for all second predicted success probabilities. The features described in this paragraph, in combination with one or more of the first example through the third example, form a fourth example. A weighting factor for all pixels of the image can reduce the computing outlay for adapting the second weighting factors.

The second weighting factors can include a respective weighting factor for each first predicted success probability and a respective weighting factor for each second predicted success probability. The features described in this paragraph, in combination with one or more of the first example through the third example, form a fifth example. A pixel-wise second weighting matrix can increase the accuracy and flexibility of the trained blending model.

The robot control model can include a first convolutional neural network having the first weighting factors and a second convolutional neural network having the second weighting factors. The production of the third pickup prediction can include: supplying the first pickup robot configurations and the second pickup robot configurations to the first convolutional neural network in order to produce the third pickup robot configurations, and supplying the first predicted success probabilities and the second predicted success probabilities to the second convolutional neural network in order to produce the third predicted success probabilities. The features described in this paragraph, in combination with the first example, form a sixth example.

A convolutional neural network can have lower complexity in comparison with the above-described identical weighting factors and/or weighting matrices. This can increase the efficiency of the robot control model. In addition, the convolutional neural networks are scalable, and thus increase flexibility. In addition, a parallelization of modern graphics processor (GPU) architectures can be exploited by, for example, parallelizing the first convolutional neural network and the second convolutional neural network. Clearly, in this way a time outlay for the training can be reduced, and consequently the efficiency can be increased.

The method can further include: producing a segmentation image by segmenting the image, a plurality of pixels of the segmentation image being assigned to the one or more objects; supplying the generated segmentation image to a first weighting model of the robot control model in order to produce the first weighting factors (which can optionally have a respective weighting factor for each pixel of the image); supplying the produced segmentation image to a second weighting model of the robot control model in order to produce the second weighting factors (which can optionally have a respective weighting factor for each pixel of the image); the training of the robot control model by adapting the first weighting factors and the second weighting factors including an adaptation of the first weighting model and of the second weighting model. The features described in this paragraph, in combination with one or more of the first example through the fifth example, form a seventh example. Here, the first weighting model and the second weighting model can use the segmentation image, independent of the task of the robot device, to take into account additional criteria relating to the picking up of objects, such as regions that are not suitable for picking up objects.

The method can further include: for each surface shown in the image, ascertaining a normal vector of the depicted surface and an associated standard deviation; supplying the ascertained normal vectors and the associated standard deviations to a third weighting model of the robot control model in order to produce the first weighting factors (which can optionally include a respective weighting factor for each pixel of the image); supplying the ascertained normal vectors and the associated standard deviations to a fourth weighting model of the robot control model in order to produce the second weighting factors (which can optionally include a respective weighting factor for each pixel of the image); the training of the robot control model by adapting the first weighting factors and the second weighting factors including an adaptation of the third weighting model and of the fourth weighting model. The features described in this paragraph, in combination with one or more of the first example through the fifth example, form an eighth example. Here, the first weighting model and the second weighting model can use the normal vectors with associated standard deviations, independent of the task of the robot device, to take into account additional criteria relating to the picking up of objects, such as regions that are not suitable for picking up objects.

Each pickup robot configuration vector can be a tuple of values that describes a configuration of the robot device. One or more values of a target tuple that describes a target pickup robot configuration can be assigned to the at least one pixel in the target data. The robot control model can be trained in such a way that for the at least one pixel the robot control model produces a third pickup robot configuration vector whose tuple of values includes the one or more values of the target tuple (and optionally that the third predicted success probability assigned to the third pickup robot configuration vector is increased). The features described in this paragraph, in combination with one or more of the first example through the eighth example, form a ninth example. Clearly, the robot control model can be trained both with respect to a probability of a successful picking up and also with respect to the configuration of the robot device by which the object can be successfully picked up.

In the target data, at least one failed picking up may be assigned to another pixel of the image, and the robot control model further being trained, by adapting the first weighting factors and the second weighting factors, in such a way that the third predicted success probability produced for the at least one other pixel is reduced. The features described in this paragraph, in combination with one or more of the first example through the ninth example, form a tenth example. Clearly, the robot control model can learn not only which pixels are suitable for picking up an object, but also which are suitable.

A method for controlling a robot device can include: acquiring an image that shows one or more objects; supplying the image to a robot control model, trained according to one of the first example through the tenth example, in order to produce a third pickup prediction; for the third pickup robot configuration vector of the third pickup prediction, to which vector the highest third predicted success probability is assigned, controlling the robot device in order to pick up the object, of the one or more objects, assigned to the pixel of the third pickup robot configuration vector, according to the third pickup robot configuration vector. The method described in this paragraph forms an eleventh example.

A computer program can have instructions that, when executed by a processor, cause the processor to carry out a method according to one or more of the first example through the eleventh example. The computer program having the features described in this paragraph forms a twelfth example.

A computer-readable medium (e.g. a computer program product, a nonvolatile storage medium) can store instructions that, when executed by a processor, cause the processor to carry out a method according to one or more of the first example through the eleventh example. The computer-readable medium having the features described in this paragraph forms a thirteenth example. A training device can include a computer that is set up to carry out the method according to one or more of the first example through the tenth example. The training device having the features described in this paragraph forms a fourteenth example.

A robot device can include: at least one robot arm that is set up to pick up an object, and a control device that is set up to: ascertain a third pickup prediction for an image that shows one or a plurality of objects, using a robot control model trained according to one of the first example through the tenth example; and, for the third pickup robot configuration vector of the third pickup prediction, to which vector the highest third predicted success probability is assigned, controlling the at least one robot arm to carry out the picking up of the object, of the one or more objects, assigned to the pixel of the third pickup robot configuration vector, according to the third pickup robot configuration vector. The robot device having the features described in this paragraph forms a fifteenth example. Clearly, the robot device can successfully pick up an object with an increased probability.

Exemplary embodiments of the present invention are shown in the figures and are explained in more detail in the following description.

BRIEF DESCRIPTION OF THE DRAWINGS

FIG. 1 shows an exemplary robot device system according to various specific example embodiments of the present invention.

DETAILED DESCRIPTION OF EXAMPLE EMBODIMENTS

Figure 2A:
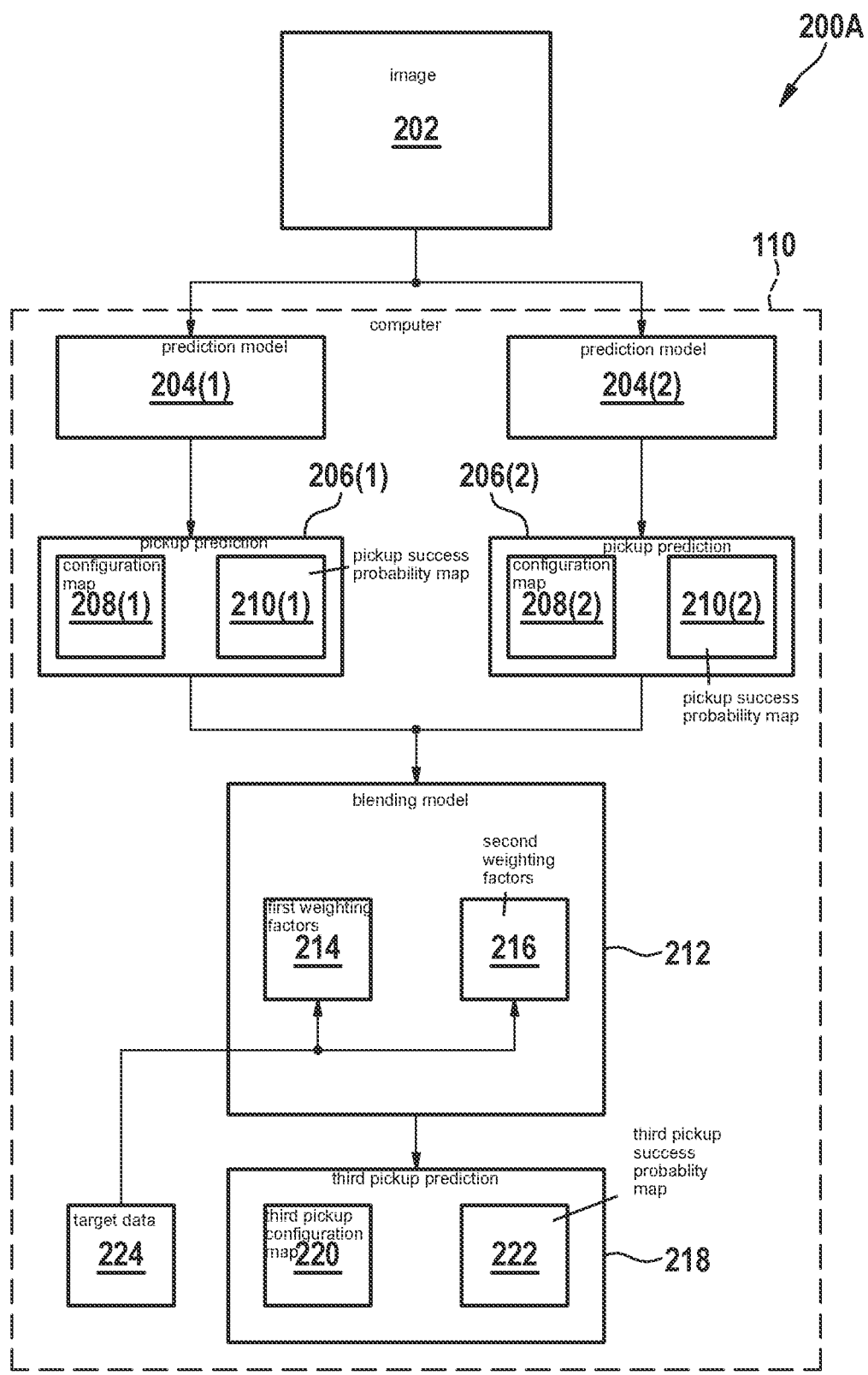
FIGS. 2A and 2B each show a flow diagram for training a robot control model according to various specific example embodiments of the present invention.

In a specific embodiment, a "computer" can be understood as any type of logic-implementing entity, which can be hardware, software, firmware, or a combination thereof. Therefore, in a specific embodiment a "computer" can be a hardwired logic circuit or a programmable logic circuit, such as a programmable processor, for example a microprocessor (e.g. a CISC (processor with a large instruction set) or an RISC (processor with a reduced instruction set)). A "computer" can have one or more processors. A "computer" can also be software that is implemented or executed by a processor, for example any type of computer program, e.g. a computer program that uses a virtual machine code such as Java. Every other type of implementation of the respective functions, described in more detail below, can be understood, in agreement with an alternative specific embodiment, as a "computer."

In the controlling of robot devices for picking up and moving objects, robot control models can be used to ascertain configurations of the robot device. Depending on the application, different prediction models may have advantages and disadvantages. Various exemplary embodiments relate to a robot control model that is able to take into account the advantages and disadvantages of individual prediction models and to ascertain a configuration of the robot device by which the robot device will successfully pick up an object with a higher probability. Clearly, an improved robot control model for picking up objects is provided.

FIG. 1 shows a robot device system 100. Robot device system 100 can include a robot device 101. The robot device 101 shown in FIG. 1 and described as an example in the following is an illustration of an exemplary robot device, and can for example include an industrial robot in the form of a robot arm for moving, assembling, or processing a workpiece. It is to be noted that the robot device can be any type of computer-controlled device, such as a robot (e.g., a manufacturing robot, a maintenance robot, a household robot, a medical robot, etc.), a vehicle (e.g. an autonomous vehicle), a household device, a production machine, a personal assistant, an access control system, etc.

Robot device 101 has robot limbs 102, 103, 104 and a base (or generally a holder) 105 by which robot elements 102, 103, 104 are held. The term "robot limb" refers to the movable parts of robot device 101, whose actuation enables a physical interaction with the environment, e.g., in order to perform a task, e.g. in order to execute or carry out one or more skills.

For the controlling, robot device system 100 contains a control device 106 that is set up to realize the interaction with the environment according to a control program. The last limb 104 (as seen from base 105) of robot elements 102, 103, 104 is also designated end effector 104, and can contain one or more tools, such as a grasping tool or a suction tool (e.g., a suction head) or the like.

The other robot limbs 102, 103 (closer to base 105) can form a positioning device, so that, together with end effector 104, a robot arm 120 (or jointed arm) is provided with end effector 104 at its end. Robot arm 120 is a mechanical arm that can perform functions in a manner similar to a human arm (possibly with a tool at its end).

Robot device 101 can contain connecting elements 107, 108, 109 that connect robot limbs 102, 103, 104 to one another and to base 105. A connecting element 107, 108, 109 can have one or more joints, of which each can provide a rotational movement and/or a translational movement (i.e., a displacement) for associated robot limbs relative to one another. The movement of robot limbs 102, 103, 104 can be initiated using actuators that are controlled by control device 106.

The term "actuator" can be understood as a component that is suitable for influencing a mechanism in response to being driven. The actuator can convert instructions (the so-called activation) outputted by control device 106 into mechanical movements. The actuator, e.g., an electromechanical transducer, can be set up to convert electrical energy into mechanical energy in response to its controlling.

The term "control device" can be understood as referring to any type of logical implementation unit that can contain for example a circuit and/or a processor that is able to execute software, firmware, or a combination thereof stored in a storage medium, and that can issue instructions, e.g., to an actuator in the present example. The control device can be set up, for example by program code (e.g., software), to control the operation of a system, in the present example a robot.

In the present example, control device 106 contains a computer 110 and a memory 111 that stores code and data on the basis of which computer 110 controls robot device 101. According to various specific embodiments, control device 106 controls robot device 101 on the basis of a robot control model 112 stored in memory 111.

According to various specific embodiments, robot device 101 (e.g., robot arm 120) can be set up to pick up one or more objects 114. According to various specific embodiments, robot device 101 (e.g., robot arm 120) can be set up to move a picked-up object.

According to various specific embodiments, robot device system 100 can have one or more sensors. The one or more sensors can be set up to provide sensor data that characterize a state of the robot device. For example, the one or more sensors can include an imaging sensor, such as a camera (e.g. a standard camera, a digital camera, an infrared camera, a stereo camera, etc.), a radar sensor, a lidar sensor, a position sensor, a speed sensor, an ultrasonic sensor, an acceleration sensor, a pressure sensor, etc. According to various specific embodiments, the imaging sensor can be set up to provide (e.g., to acquire and to communicate to control device 106) images that show the one or more objects 114. An image can be an RGB image, an RGB-D image, or a depth image (also called a D image). A depth image described herein can be any type of image that includes depth information. Clearly, a depth image can include three-dimensional information about one or more objects. A depth image described herein can for example have a point cloud that is provided by a lidar sensor and/or by a radar sensor. A depth image can for example be an image provided by a lidar sensor, having depth information.

Robot control model 112 can be set up to ascertain, for an image that shows the one or more objects 114, a robot configuration for picking up (and optionally also for moving) an object of the one or more objects 114. Control device 106 can be set up to control, using robot control model 112, robot device 101 to carry out the picking up of the object using the ascertained robot configuration. An ascertaining of control parameters on the basis of the image according to one of the robot control models (e.g., that of robot control model 112) is described with reference to FIG. 4. An exemplary training of such a robot control model is described with reference to FIG. 2A and FIG. 2B.

A "picking up of an object," as used herein, can be a contacting of the object such that the object can be moved as a result of a movement of robot device 101 (e.g., of robot arm 120). The picking up can be a function of the type of end effector 104. For example, end effector 104 can have a grasping tool, and the picking up of an object can be a grasping of the object. For example, end effector 104 can have a suction device (e.g. a suction head), and the picking up of an object can be a suctioning of the object.

According to various specific embodiments, robot control model 112 can be produced (e.g., trained) while robot device 101 is not in operation. According to various specific embodiments, the produced robot control model 112 can be used during operation of robot device 101 in order to ascertain skills that are to be carried out by robot device 101. According to various specific embodiments, produced robot control model 112 can be additionally trained during operation of robot device 101.

FIG. 2A shows a flow diagram 200A for training a robot control model according to various specific embodiments. For illustration, in the following various aspects are described with reference to control device 106 and robot device 101. It is to be noted that other robot device systems may be used.

According to various specific embodiments, an image 202 that shows one or more objects can be provided. Image 202 can for example be provided by the one or more sensors 113, and can show the one or more objects 114.

Computer 110 can be set up to implement the robot control model. The robot control model can include a plurality of prediction models $204(2 \leq i \leq N)$. Here, N can be any whole number greater than or equal to two. Clearly, the robot control model can have a set G of prediction models $g_i$ according to $G=\{g_i\}_i=1^N$. The plurality of prediction models $204(2 \leq i \leq N)$ can be different from one another. Each prediction model of the plurality of prediction models $204(2 \leq i \leq N)$ can be set up to produce a pickup prediction for picking up an object in response to an inputting of an image. Here, different images can be supplied to the respective prediction models. For example, some of the plurality of prediction models $204(2 \leq i \leq N)$ can be set up to produce the pickup prediction for an RGB image, and others of the plurality of prediction models $204(2 \leq i \leq N)$ can be set up to produce the pickup prediction for a depth image (or RGB-D image). A prediction model $204(i)$ of the plurality of prediction models $204(2 \leq i \leq N)$ can also be set up to produce the pickup prediction in response to an inputting of an RGB image and of a depth image. Here, the one or more sensors 113 can be set up to acquire the respective images.

Clearly, an ensemble method is provided for improving results of individual prediction models. According to various specific embodiments described herein, the pickup predictions $206(2 \leq i \leq N)$ produced by the multiplicity of prediction models $204(2 \leq i \leq N)$ can be stacked using linear or nonlinear blending. This blending can take place (e.g. pixel-wise)

using neural convolutional networks. In addition, regions can be taken into account that are not suitable for picking up objects. These regions can be ascertained independently of the respective task of the robot device.

As an illustration, the plurality of prediction models $204(2 \leq i \leq N)$ are described in the following such that they are set up to produce respective pickup predictions for an image, I, 202. It will be understood that image I, 202 can be different images, or also a plurality of images, for the respective prediction model 204(*i*), as described above. A prediction model of the plurality of prediction models 204 ($2 \leq i \leq N$) can for example be a model according to one of references [1] to [5].

Each prediction model of the plurality of prediction models $204(2 \leq i \leq N)$ can be set up to produce a respective pickup prediction 206(*i*) in response to a supplying of image 202. Each pickup prediction 206(*i*) can include a pickup robot configuration map 208(*i*) and a pickup success probability map 210(*i*). A pickup robot configuration map 208(*i*) can have, for each pixel of image 202, a respective pickup robot configuration vector that describes a configuration of robot device 101. Here, the respective pixel can be regarded as a pickup center. A pickup success probability map 210(*i*) can have, for each pixel of image 202, a respective predicted success probability for the picking up of an object according to the pickup robot configuration vector that is assigned to the respective pixel.

According to various specific embodiments, the plurality of prediction models $204(2 \leq i \leq N)$ can output in different data that have pickup robot configuration vectors and assigned predicted success probabilities. Here, computer 110 can be set up to structure the outputted data according to pickup robot configuration map 208(*i*) and pickup success probability map 210(*i*).

Clearly, in this way each prediction model $g_i$, 204(*i*) for image I, 202 can produce a pickup prediction with a pickup robot configuration map $A_i$, 208(*i*) and a pickup success probability map $Q_i$, 210(*i*) according to $(Q_i, A_i) = g_i(I)$. According to various specific embodiments, the pickup robot configuration maps $A_i$, 208(*i*) of all prediction models $204(2 \leq i \leq N)$ can be ascertained in parallel. The pickup success probability maps $Q_i$, 210(*i*) of all prediction models $204(2 \leq i \leq N)$ can be ascertained in parallel.

A probability used herein has an assigned probability value. If, herein, a probability is compared to a different probability or to a threshold value (e.g., greater than, smaller than, higher, lower, above), this relates to the probability value assigned to the probability. A success probability assigned to a pickup robot configuration vector can indicate the probability with which a successful execution of the picking up is expected using the configuration that describes the pickup robot configuration vector. A successful execution of the picking up can be for example that the end effector can grasp, lift, and/or move the object assigned to the robot configuration. This can hold analogously for other skills (e.g., a movement skill of robot arm 120). The ascertaining of a success probability for a pickup robot configuration can be for example a classification (e.g. the class "successful") of the pickup robot configuration.

Figure 3A:
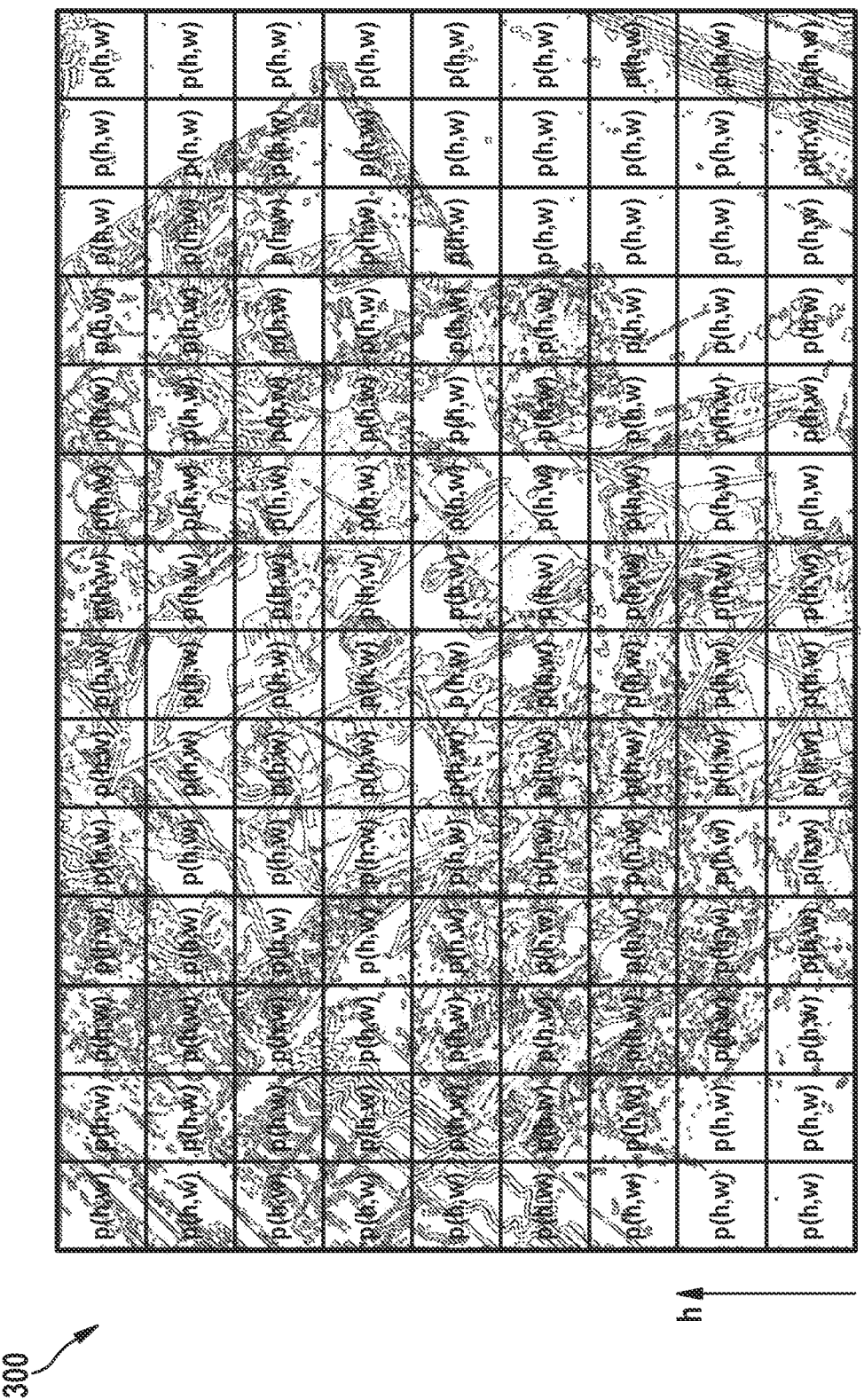
FIG. 3A shows an exemplary image.
Figure 3B:
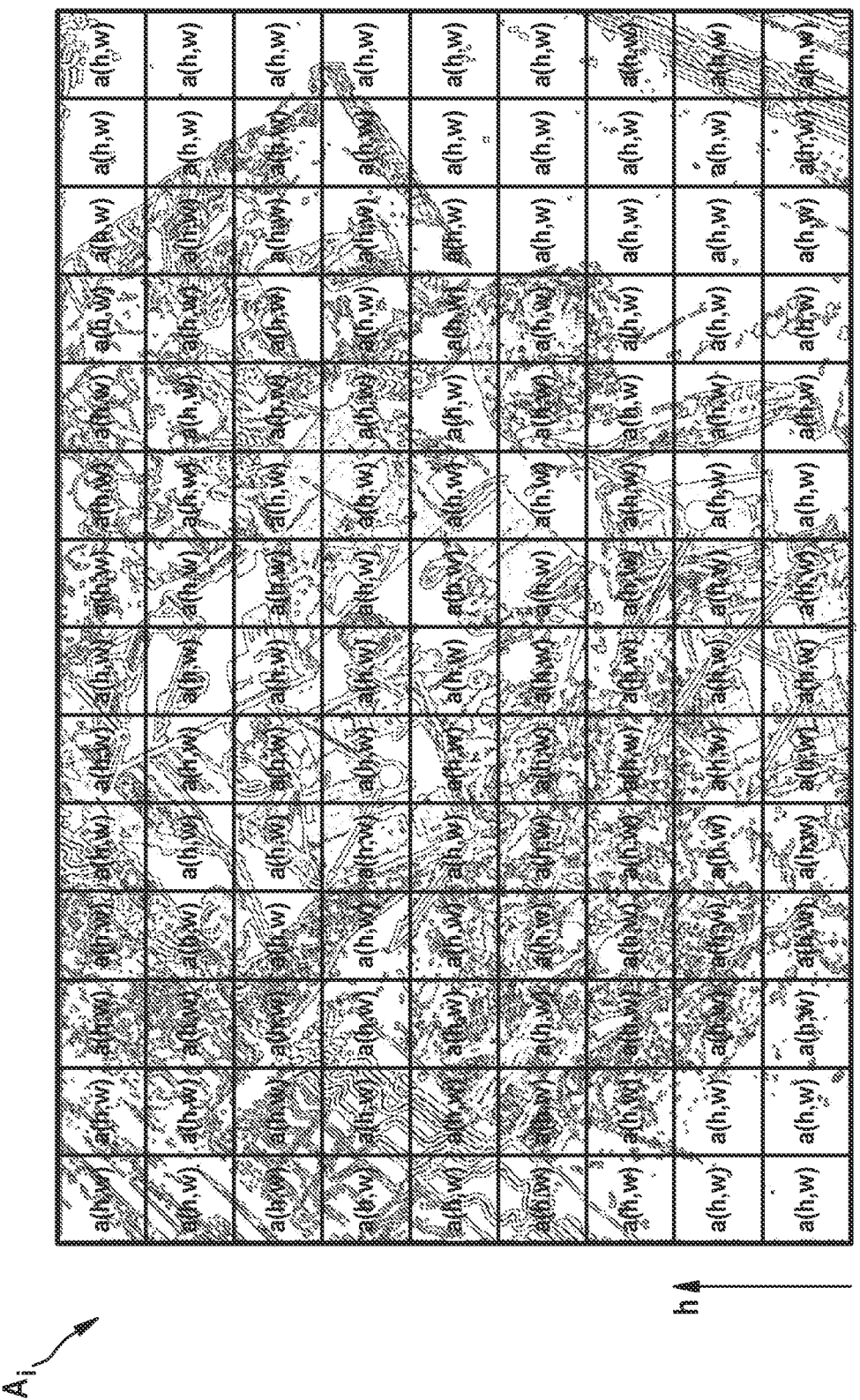
FIG. 3B shows an illustration of an exemplary ascertained pickup robot configuration map, according to the present invention.
Figure 3C:
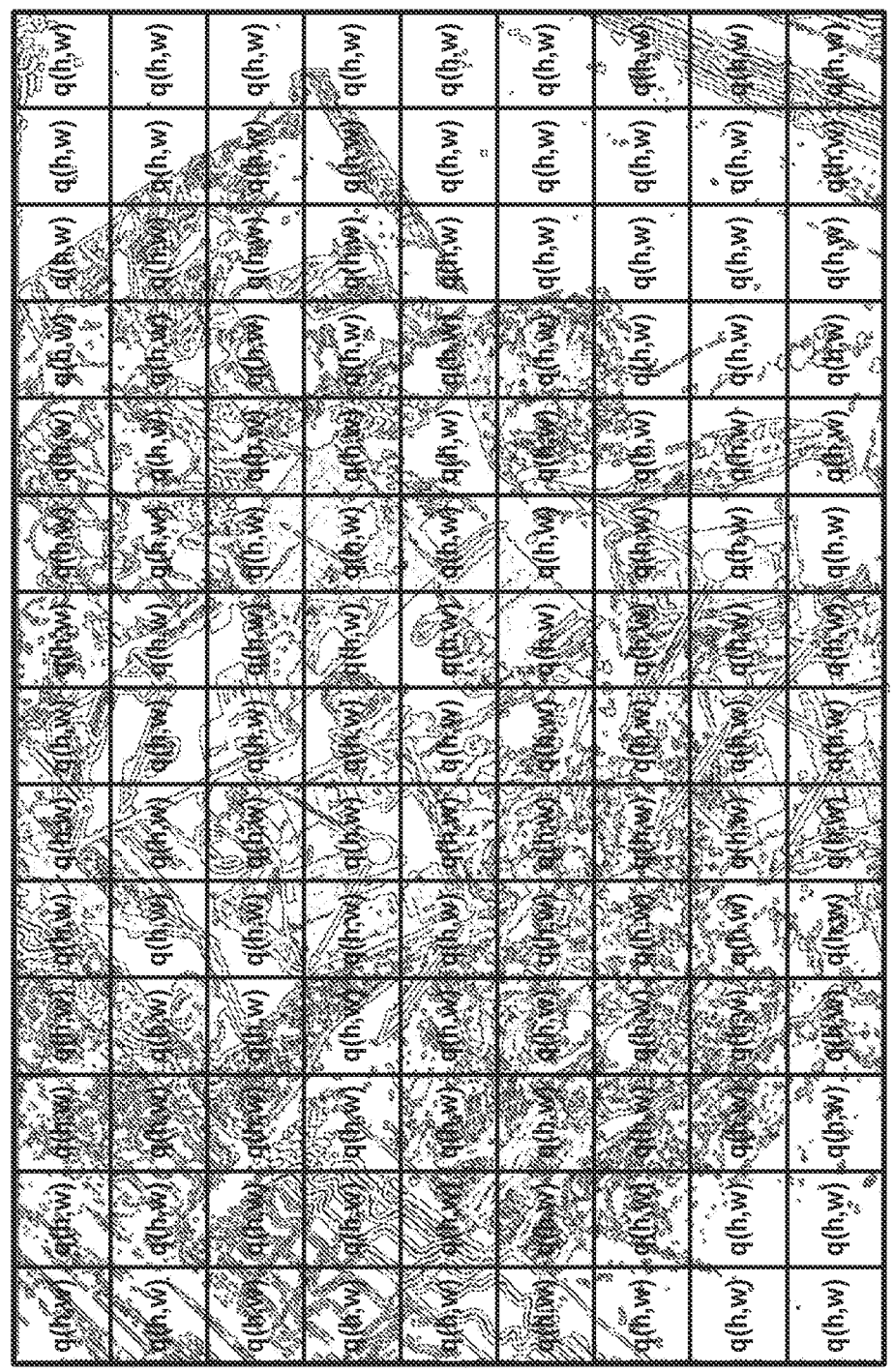
FIG. 3C shows an illustration of an exemplary ascertained pickup success probability map, according to the present invention.

An exemplary illustration in this regard is shown in FIG. 3A through 3C. An exemplary image 300 can have a height H and a width W, and can be formed by a multiplicity of pixels p(h, w) in the height direction h (where $0 \leq h \leq H$) and the width direction w (where $0 \leq w \leq W$) (see FIG. 3A). It will be understood that the pixels p(h, w) for image 300 are not, or are not necessarily, to scale. A pickup robot configuration map $A_i$ produced for image 300 can have, for each of the pixels p(h, w), a respective pickup robot configuration vector a(h, w) (see FIG. 3B). A pickup success probability map $Q_i$ produced for image 300 can have, for each of the pixels p(h, w), a respective predicted success probability q(h, w) (see FIG. 3C).

A pickup robot configuration vector, as used herein, can have a tuple of values that describes a configuration of robot device 101. Each value of the tuple can describe a parameter of the configuration of robot device 101. A pickup robot configuration vector can be a function of the robot device (e.g., of robot device 101) for which the robot control model is to be trained or has been trained. A pickup robot configuration vector can for example be a function of the type of end effector 104 (e.g., realized as a grasping tool or as a suction head), the degrees of freedom of the end effector (e.g. defined by robot limbs 102, 103), etc. For example, end effector 104 can have a grasping tool, and one or more values of the tuple that forms the pickup robot configuration vector can describe a grasper width, a yaw, a yaw rate, an inclination, and/or a rotation of robot device 101. A robot configuration, as used herein, can be a robot pose (e.g., an end effector pose). A robot configuration can for example have an end effector rotation (e.g. an end effector orientation). A robot configuration can for example have an end effector position (e.g., an end effector translation). The end effector position t can be a 3D position $t \in \mathbb{R}^3$. Clearly, a robot configuration can be a 6D configuration of the end effector that includes the 3D position and the orientation (e.g., orientation in the 3D space). The pickup robot configuration can be the robot configuration that is ascertained for the picking up of an assigned object.

According to various specific embodiments, each pickup robot configuration vector can be a tuple having a number of D values. Clearly, a pickup robot configuration can have a size, or dimension, of D. According to various specific embodiments, the plurality of prediction models $204(2 \leq i \leq N)$ can output differently sized tuples of configuration values. Here, computer 110 can be set up to structure the differently sized tuples of configuration values according to a standard tuple having dimension D, which forms the pickup robot configuration vector. According to various specific embodiments, the pickup robot configuration map $A_i$ can have a size of H\*W\*D. A predicted success probability, as used herein, can have for example a value between 0 and 1. The predicted success probability can for example be a percentual success probability, where 0 can indicate a success probability equal to zero and 1 can indicate a success probability of 100%. According to various specific embodiments, pickup success probability map $Q_i$ can have a size of H\*W\*1.

As an illustration, FIG. 2A shows a first prediction model 204(*i*=1) and a second prediction model 204(*i*=2) for N=2. In response to a supplying of image I, 202, first prediction model 204(1) can produce first pickup prediction 206(1) having first pickup robot configuration map $A_1$ (having a first pickup robot configuration vector for each pixel of image I, 202) and first pickup success probability map $Q_1$ (having a first predicted success probability for each pixel of image I, 202). In response to a supplying of image I, 202, second prediction model 204(2) can produce second pickup prediction 206(2) having second pickup robot configuration map $A_2$ (having a second pickup robot configuration vector for each pixel of image I, 202), and second pickup success probability map $Q_2$ (having a second predicted success probability for each pixel of image I, 202).

The robot control model can have a blending model 212. Blending model 212 can be set up to produce a third pickup prediction 218 in response to a supplying of all pickup predictions 206 (2≤i≤N) produced by the plurality of prediction models 204(2≤i≤N) (e.g., first pickup prediction 206(1) and second pickup prediction 206(2) for N=2).

Clearly, blending model 212 can blend the pickup predictions 206 (2≤i≤N) produced by the plurality of prediction models 204(2≤i≤N). In the following, linear blending is described as an illustration.

Third pickup prediction 218 can have a third pickup robot configuration map A, 220, having a third pickup robot configuration vector for each pixel of image I, 202. Third pickup prediction 218 can have a third pickup success probability map Q, 222, having a third predicted success probability for each pixel of image I, 202.

For each pixel of image I, 202, third pickup robot configuration map A, 220 can have the pickup robot configuration vector a(h, w) having, of all the pickup robot configuration maps $A_i$, the highest predicted success probability q(h, w). For each pixel of image I, 202, third pickup success probability map Q, 222 can have the highest predicted success probability q(h, w) in each case. Computer 110 can be set up to select the third pickup robot configuration vector having the highest assigned predicted success probability and to produce items of control information by which robot device 101 is controlled according to the third pickup robot configuration vector. The selection of a prediction model 204(i) having the highest predicted success probability and of the associated pixel in this regard can be described according to $h^*, w^*, i^* = \arg\max_{h,w,i} Q_i(h,w)$ where $h^*$ and $w^*$ indicate the position of the selected pixel $p(h^*, w^*)$ and $i^*$ indicates the selected prediction model 204($i^*$). The associated pickup robot configuration vector can be ascertained according to $\alpha = A_{i^*}(h^*, w^*)$.

The mapping of the pickup robot configuration maps $A_i$, 208(i) produced by the plurality of prediction models 204 (2≤i≤N) and pickup success probability maps $Q_i$, 210(i) onto the third pickup robot configuration map A, 220 and the third pickup success probability map Q, 222 can be described, using a function f, as $(Q, A) = f(Q_{1:N}, A_{1:N})$.

According to various specific embodiments, blending model 212 can have first weighting factors 214 and second weighting factors 216. Blending model 212 can be set up to produce the third pickup robot configuration map A, 220 through a combination, weighted by first weighting factors 214, of the pickup robot configuration maps $A_i$, 208(i) produced by the plurality of prediction models 204(2≤i≤N). Blending model 212 can be set up to produce the third pickup success probability map Q, 222 through a combination, weighted by second weighting factors 216, of the pickup success probability maps $Q_i$, 210(i) produced by the plurality of prediction models 204(2≤i≤N).

A weighted combination can be for example a weighted sum or a weighted product. As illustration, various possibilities of the weighted combination are described herein as a weighted sum, as an example.

In the following, as an example various possibilities of the weighted combination of pickup robot configuration maps $A_i$, 208(i) and the weighted combination of the pickup success probability maps $Q_i$, 210(i) are described.

For each prediction model 204(i), first weighting factors 214 can have a respective (first) weighting factor $\theta_i$. The respective first weighting factor $\theta_i$ can be a scalar value. Clearly, the first weighting factor $\theta_i$ of a prediction model 204(i) can be identical for all pixels of image I, 202. The third pickup robot configuration map A, 220 can be for example ascertained, using the first weighting factors $\theta_i$ (where 2≤i≤N), according to $A = \Sigma \theta_i A_i$.

Second weighting factors 216 can have a respective (second) weighting factor $w_i$ for each prediction model 204(i). The respective second weighting factor $w_i$ can be a scalar value. Clearly, the second weighting factor $w_i$ of a prediction model 204(i) can be identical for all pixels of image I, 202. The third pickup success probability map Q, 222 can be for example ascertained, using second weighting factors $w_i$ (where 2≤i≤N), according to $Q = \Sigma w_i Q_i$.

Blending model 212 can be trained by adapting first weighting factors 214 and second weighting factors 216. Here, a first weighting factor $\theta_i$ that is the same for all pixels of image I, 202 and/or a second weighting factor $w_i$ that is the same for all pixels of image I, 202 can reduce the computing outlay for training blending model 212.

However, first weighting factors 214 can also have a respective first weighting factor for each prediction model 204(i) and for each pixel of image I, 202. Correspondingly, first weighting factors 214 can have a respective first weighting matrix $\Theta_i$ for each prediction model 204(i). Exactly one element of first weighting matrix $\Theta_i$ can be assigned to each pixel of image I, 202. Each first weighting matrix $\Theta_i$ can include the size of the pickup robot configuration map $A_i$, 208(i), i.e. H*W (and optionally H*W*D). The third pickup robot configuration map A, 220 can be ascertained for example using the first weighting matrices $\Theta_i$ (where 2≤i≤N), according to $A = \Sigma \Theta_i \odot A_i$. Here $\odot$ is the (element-wise) Hadamard product.

Second weighting factors 216 can include a respective second weighting factor for each prediction model 204(i) and for each pixel of image I, 202. Correspondingly, second weighting factors 216 can include a respective second weighting matrix $W_i$ for each prediction model 204(i). Exactly one element of second weighting matrix $W_i$ can be assigned to each pixel of image I, 202. Each second weighting matrix $W_i$ can include the size of the pickup success probability map $Q_i$, 210(i), i.e. H*W. Third pickup success probability map Q, 222 can for example be ascertained using second weighting matrices $W_i$ (where 2≤i≤N), according to $Q = \Sigma W_i \odot Q_i$.

In contrast to the identical first weighting factor $\theta_i$, 202 and/or the identical second weighting factor $w_i$, for all pixels of image I, 202 a pixel-wise first weighting matrix $\theta_i$, or second weighting matrix $W_i$, can increase the accuracy and flexibility of the trained blending model 212.

According to various specific embodiments, first weighting factors 214 of blending model 212 can be pre-trained using the same first weighting factors $\theta_i$ (i.e. each element of the first weighting matrix $\Theta_i$ of a respective prediction model 204(i) has the value $\theta_i$), and subsequently the first weighting factors 214 of blending model 212 can be trained individually for each pixel of the image. Clearly, this can initially ensure a comparatively fast training progress, and at the same time can ensure a high degree of accuracy of the trained blending model 221 (i.e. of the trained first and second weighting factors).

Figure 2B:
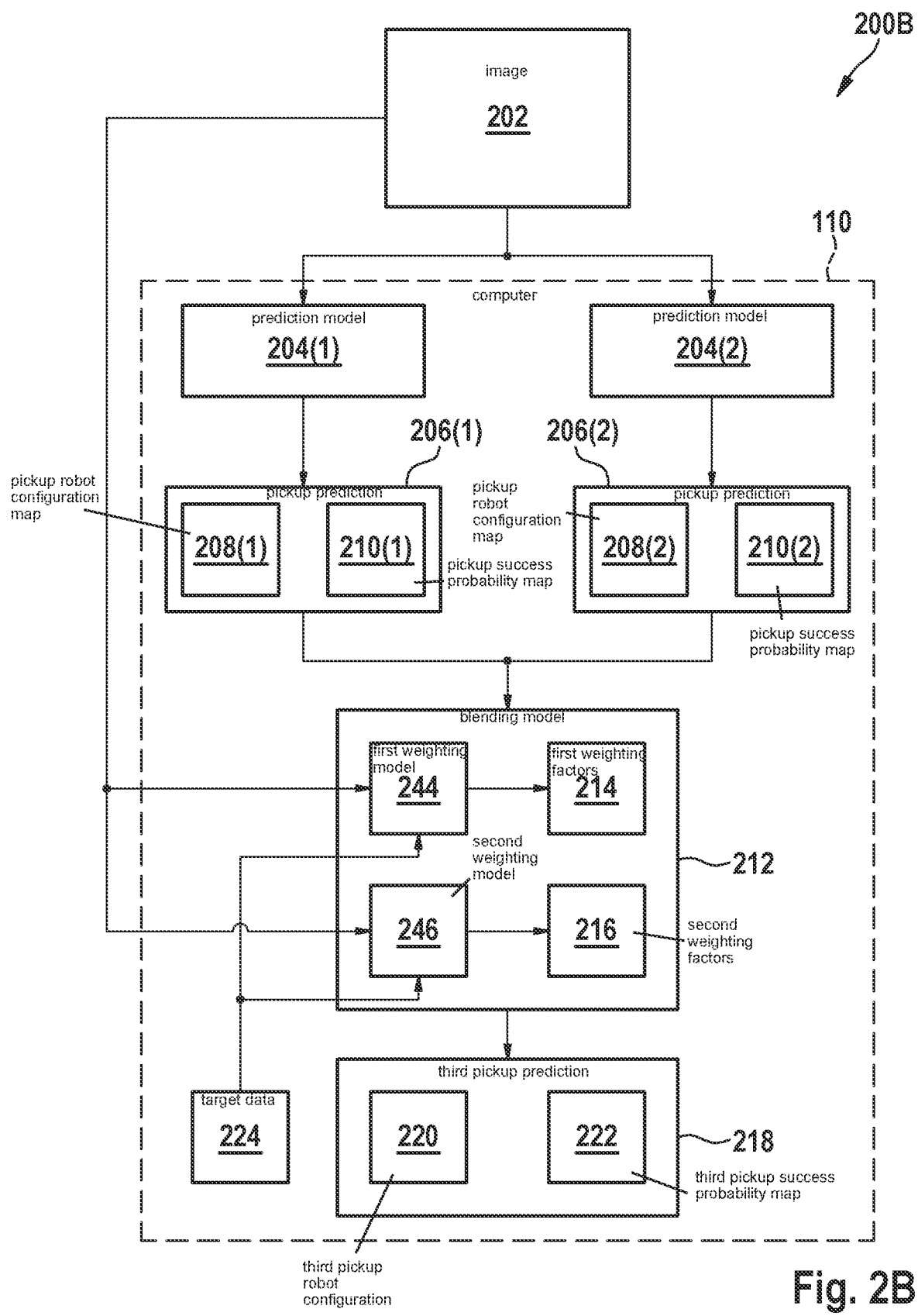

FIG. 2B shows a flow diagram 200B for training the robot control model, according to various specific embodiments. According to various specific embodiments, blending model 212 can have a first weighting model 244. First weighting model 244 can be set up to output first weighting factors 214 in response to a supplying of image I, 202 and all pickup robot configuration maps $A_i$. Consequently, first weighting factors 214 can be a function of image I, 202. For example, first weighting factors 214 can include the respective first weighting factor $\theta_i$ for each prediction model 204(i), which in this case can be a function of image I, 202 (i.e. $\theta_i(I)$). Third pickup robot configuration map A, 220 can be ascertained according to $A=\Sigma\theta_i(I)A_i$. First weighting factors 214 can however also include the respective first weighting matrix $\theta_i$ for each prediction model 204(*i*).

According to various specific embodiments, blending model 212 can have a second weighting model 246. Second weighting model 246 can be set up to output second weighting factors 216 in response to a supplying of image I, 202 and all pickup success probability maps $Q_i$, 210(*i*). Consequently, the second weighting factors 216 can be a function of image I, 202. Second weighting factors 216 can for example include the respective second weighting factor $w_i$ for each prediction model 204(*i*), which in this case can be a function of image I, 202 (i.e. $w_i(I)$. Third pickup success probability map Q, 222 can be ascertained according to $Q=\Sigma w_i(I)Q_i$. The second weighting factors 216 can however also include the respective second weighting matrix $W_i$ for each prediction model 204(*i*).

First weighting model 244 and/or second weighting model 246 can be set up to produce a segmentation image by segmentation (i.e. image segmentation) of image I, 202. As described herein, image I, 202 can show the one or more objects 114. The segmentation image can show a segmentation (e.g. classification) of the one or more objects 114. The respective weighting model can be set up to produce the weighting factors on the basis of the segmentation image. The respective weighting model can for example ascertain, on the basis of the segmentation image, the regions of image I, 202 in which none of the one or more objects 214 are located. As an illustrative example, the weighting factors that are associated with the pixels of these regions can be set equal to zero, so that third pickup success probability map Q, 222 for example has a predicted success probability q(h, w) for this pixel equal to zero.

First weighting model 244 and/or second weighting model 246 can be set up to ascertain a respective normal vector and an associated standard deviation for each surface shown in image I, 202. Clearly, the normal vector and the associated standard deviation can describe a planarity of the respective surface. The respective weighting model can be set up to produce the weighting factors on the basis of the ascertained normal vectors and associated standard deviations. The respective weighting model can ascertain, for example on the basis of the normal vectors and standard deviations, which surfaces shown in image I, 202 are not suitable for picking up an object. For example, for a grasping device or suction device of the end effector, strongly curved surfaces may not be suitable for ensuring the required adhesion of the end effector to the object (e.g. grasping or suctioning). As an illustrative example, the weighting factors that are associated with surfaces of the image and that have standard deviations above a threshold value can be set equal to zero, so that the third pickup success probability map Q, 222 has for this pixel for example a predicted success probability q(h, w) equal to zero.

Clearly, using the segmentation image and/or the normal vectors with associated standard deviations, the respective weighting model can take into account additional criteria relating to the picking up of objects regardless of the task of robot device 101. For example, regions can be taken into account that are not suitable for picking up objects.

Similar to the linear blendings described above, according to various specific embodiments blending model 212 can blend the pickup predictions 206 (2≤i≤N) produced by the plurality of prediction models 204(2≤i≤N) in non-linear fashion (non-linear blending). Similar to first weighting model 244, blending model 212 can include a first non-linear weighting model that outputs first weighting factors 214 as first non-linear weighting factors in response to a supplying of image I, 202 and all pickup robot configuration maps $A_i$, 208(*i*). Third pickup robot configuration map A, 220 can be ascertained according to $A=\Sigma g_i(I)\odot A_i$, where $g_i$ is the first non-linear weighting model, which has a respective mapping function for each prediction model i of the plurality of prediction models 204(2≤i≤N). Similar to the second weighting model 246, blending model 212 can have a second non-linear weighting model that outputs second weighting factors 216 as second non-linear weighting factors in response to a supplying of image I, 202 and all pickup success probability maps $Q_i$, 210(*i*). The third pickup success probability map Q, 222 can be ascertained according to $Q=\Sigma f_i(I)\odot Q_i$, where $f_i$ is the second non-linear weighting model, which has a respective mapping function for each prediction model i of the plurality of prediction models 204(2≤i≤N).

According to various specific embodiments, the robot control model can include a first (e.g. fully) convolutional neural network (CNN).

A convolutional neural network, as described herein, can have any number of layers and can be characterized by the format of the input data. In addition, a convolutional neural network can have a multiplicity of weighting factors that weight the data in the hidden layers of the convolutional neural network. A convolutional neural network can be trained by adapting these weighting factors. A convolutional neural network can use batch normalization, L1 regulation or L2 regulation, etc.

The first convolutional neural network can have first weighting factors 214. The first convolutional neural network can be set up to output the third pickup robot configuration map A, 220 in response to a supplying of all pickup robot configuration maps $A_i$, 208(*i*) produced by the plurality of prediction models 204(2≤i≤N). For example, computer 110 can be set up to join the pickup robot configuration maps $A_i$ produced by the plurality of prediction models 204(2≤i≤N) to one another to form a tensor of size H*W*N*D, and to supply this tensor to the first convolutional neural network. Here, the first convolutional neural network can be a three-dimensional convolutional neural network having a kernel of k*k*l (where k*k is in H*W dimensions and l is in D dimension).

According to various specific embodiments, the robot control model can have a second convolutional neural network. The second convolutional neural network can have second weighting factors 216. The second convolutional neural network can be set up to output third pickup success probability map Q, 222 in response to a supplying of all pickup success probability maps $Q_i$, 210(*i*) produced by the plurality of prediction models 204(2≤i≤N). For example, computer 110 can be set up to stack the pickup success probability maps $Q_i$, 210(*i*) produced by the plurality of prediction models 204(2≤i≤N) in N channels to form a tensor of size H*W*N, and to supply this tensor to the first convolutional neural network. Here, the second convolutional neural network can be a two-dimensional convolutional neural network having a kernel of k*k (in H*W dimensions).

Compared to the above-described identical weighting factors $\theta_i$ or $w_i$, weighting matrices $\Theta_i$ or $W_i$, and/or non-linear weighting models $f_i, g_i$, a convolutional neural network can have a lower degree of complexity. This can increase the efficiency of the robot control model. In addition, the convolutional neural networks are scalable, and thus increase flexibility. In addition, a parallelization of modern graphics processor (GPU) architectures can be exploited, for example by parallelizing the first convolutional neural network and the second convolutional neural network. The convolutional neural network can implement both linear blendings and non-linear blendings. As an example, the pickup robot configuration maps $A_i$, 208($i$) and the pickup success probability maps $Q_i$, 210($i$) of all prediction models 204($2 \leq i \leq N$) can be ascertained in parallel by another computer and supplied to computer 110, which, using the first convolutional neural network and the second convolutional neural network, ascertains in parallel the third pickup robot configuration map A, 220 and the third pickup success probability map Q, 222. Clearly, in this way the time outlay for the training can be reduced, and consequently the efficiency can be increased.

It will be understood that the pickup robot configuration maps $A_i$, 208($i$) and the pickup success probability maps $Q_i$, 210($i$) can be combined with one another using different types of combination. As an example, pickup robot configuration maps $A_i$, 208($i$) can be combined using first weighting matrix $\Theta_i$, and the pickup success probability maps $Q_i$, 210($i$) can be combined with one another using the second convolutional neural network, etc. In an example, one of the convolutional neural networks can implement a linear blending and the other convolutional neural network can implement a non-linear blending. According to various specific embodiments, the first convolutional neural network and/or the second convolutional neural network can have a segment that, for image 202, produces a segmentation image or normal vectors having associated standard deviations as described herein with reference to FIG. 2B. It will be understood that in this case image 202 can also be supplied to the respective convolutional neural network.

According to various specific embodiments, the robot control model can be trained by adapting first weighting factors (214 and second weighting factors 216 (see FIG. 2A). For this purpose, target data 224 (also referred to as training data) can be provided. Target data 224 can for example be stored in memory 111.

In target data 224, a successful picking up can be assigned to at least one pixel p(h*, w*) of image I, 202. Second weighting factors 216 can be adapted in such a way that the third predicted success probability q(h*, w*), produced for the at least one pixel p(h*, w*) to which the successful picking up is assigned, is increased.

In target data 224, a failed picking up can be assigned to at least one other pixel p(h\h*, w\w*) of image I, 202. Second weighting factors 216 can be adapted in such a way that the third predicted success probability q(h\h*, w\w*), produced for the at least one other pixel p(h\h*, w\w*) to which the failed picking up is assigned, is reduced.

In target data 224, one or more values of a target tuple can be assigned to at least one pixel p(h, w) of image I, 202. The target tuple can describe a target pickup robot configuration. First weighting factors 214 can be adapted in such a way that for the at least one pixel p(h, w) a third pickup robot configuration vector a(h, w) is produced in such a way that the tuple that describes the configurations of third pickup robot configuration vector a(h, w) has the one or more values of a target tuple. For example, the target tuple can be a target pickup robot configuration vector, and the produced third pickup robot configuration vector a(h, w) can correspond to the target pickup robot configuration vector.

In the case of first weighting model 244 and/or second weighting model 246, blending model 212 can be trained by adapting first weighting model 244 or second weighting model 246. Clearly, in this way the weighting factors produced by the respective weighting model are also adapted. First weighting model 244 and/or second weighting model 246 can be a model based on machine learning.

In the case of the first convolutional neural network and/or the second convolutional neural network, the weighting factors of the respective convolutional neural network can be adapted. Here, any type of training design can be used, such as back-propagation. A convolutional neural network can for example be trained using supervised learning (an example of such training is described in reference [4]). A convolutional neural network can for example be trained using reinforcement learning (an example of such training is described in references [2] and [5]).

According to various specific embodiments, the robot control model can be trained iteratively for a multiplicity of images and respective associated target data, as described above in exemplary fashion for image I, 202 and target data 224 (as an iteration).

The plurality of prediction models 204($2 \leq i \leq N$) can be pre-trained, can be individually trained for the target data and/or for other target data, or can be trained in common with blending model 212. In the case of the common training, blending model 212 and each prediction model 204($i$) of the plurality of prediction models 204($2 \leq i \leq N$) can be adapted in each iteration of the training.

Figure 4:
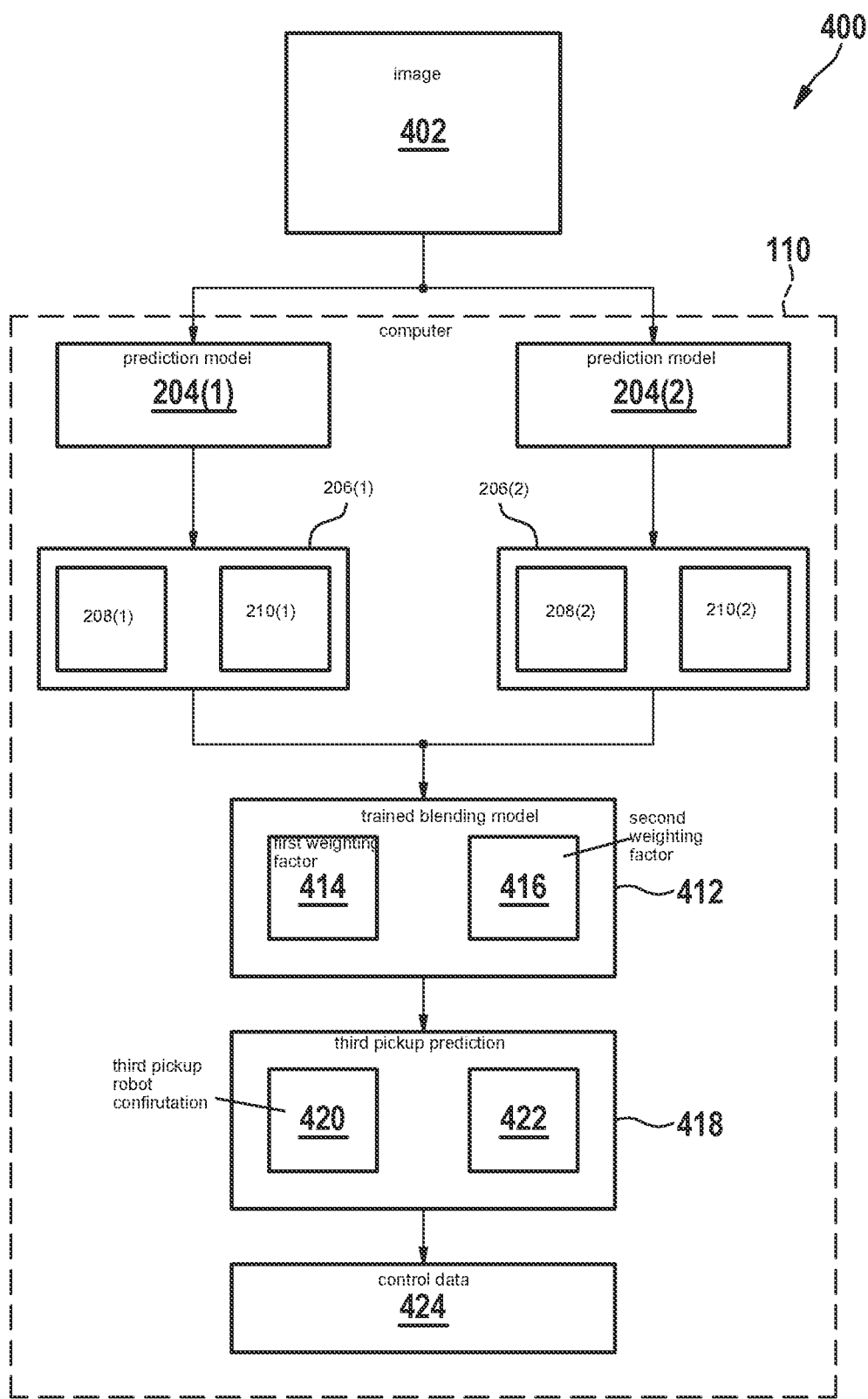
FIG. 4 shows a flow diagram for controlling a robot device according to various specific example embodiments of the present invention.

FIG. 4 shows a flow diagram 400 for controlling a robot device (e.g. robot device 101) according to various specific embodiments. Here, a robot control model can be used. The robot control model can include the plurality of prediction models 204($2 \leq i \leq N$) (e.g. the first prediction model 204(1) and the second prediction model 204(2) for N=2) and a trained blending model 412.

Trained blending model 412 can be set up to produce a third pickup prediction 418 in response to a supplying of all pickup predictions 206 ($2 \leq i \leq N$) produced for an image 402 by the plurality of prediction models 204($2 \leq i \leq N$). Third pickup prediction 418 can include a third pickup robot configuration map A, 420 and a third pickup success probability map Q, 222.

Trained blending model 412 can have first weighting factors 414 and second weighting factors 416. First weighting factors 414 and second weighting factors 416 can be set up according to first weighting factors 214 or second weighting factors 216 that were trained for a multiplicity of images. For example, trained blending model 412 can be a blending model 212 trained for a multiplicity of images.

Computer 110 can be set up to select third pickup robot configuration vector a(h, w) to which the highest third predicted success probability q(h, w) is assigned. Computer 110 can be set up to produce control data 424 for controlling robot device 101 according to the selected third pickup robot configuration vector. For example, control device 106 can control robot device 101 according to the selected third pickup robot configuration vector.

Optionally, the robot control model can be additionally trained during the operation of robot device 101. According to various specific embodiments, control device 106 can control robot device 101 to carry out the picking up of the object using the selected third pickup robot configuration vector, and can ascertain whether the picking up of the object was successfully carried out or not. For the example of training using reinforcement learning, control device 106 (e.g. computer 110) can ascertain the successful or failed picking up as a reward.

For example, a specified maximum reward (e.g. a value of the reward equal to 1) can be ascertained if the picking up of the object was successfully carried out. For example, a specified minimum reward (e.g. a value of the reward equal to 0) can be ascertained if the picking up of the object was not carried out successfully. The image for which the selected third pickup robot configuration vector was ascertained can act, in connection with the reward, as additional target data (e.g. training data) for adapting the first and/or second weighting factors.

Figure 5:
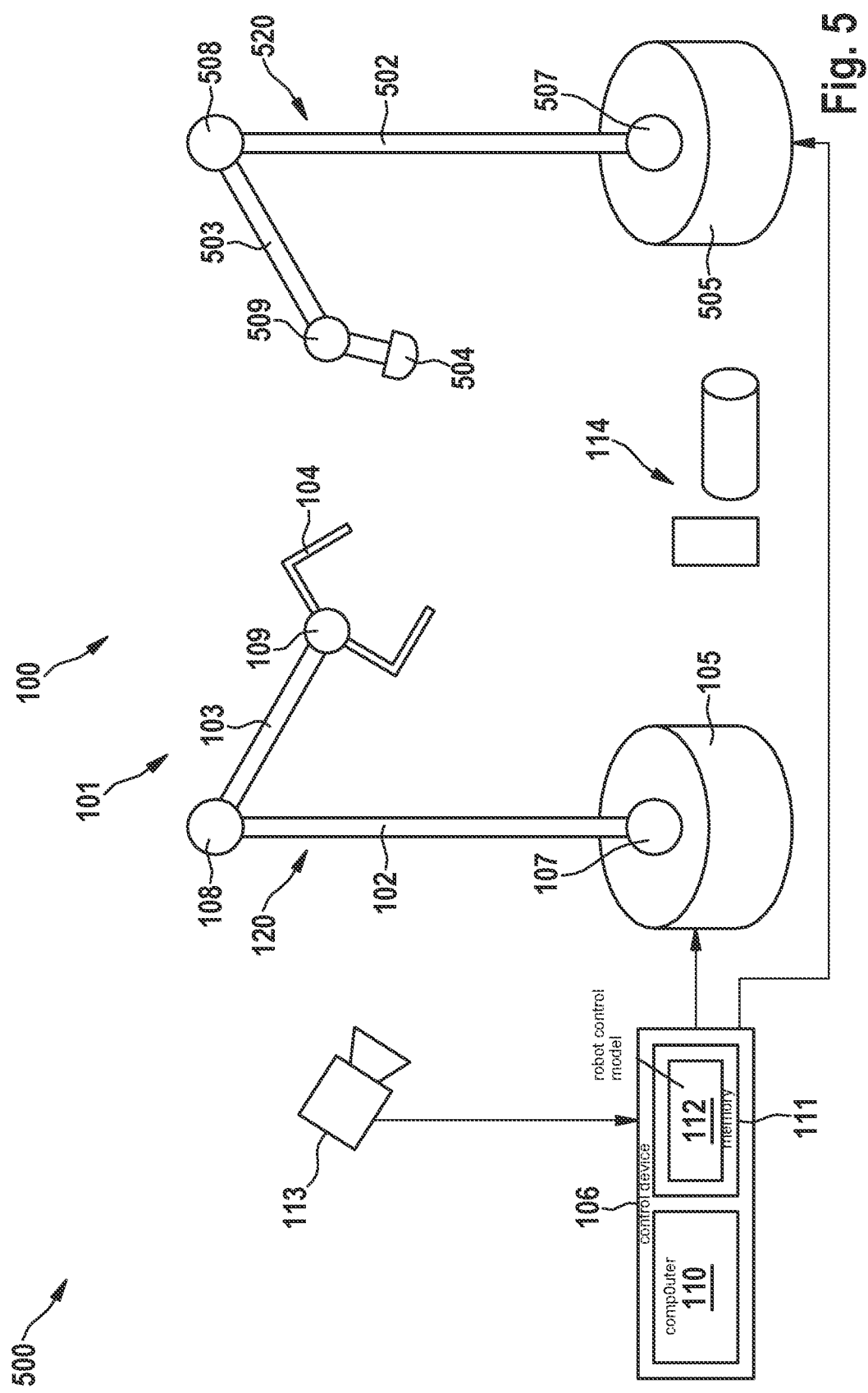
FIG. 5 shows an example of a robot device system having a plurality of robot arms, according to various specific example embodiments of the present invention.

FIG. 5 shows an example of a robot device system 500 having a plurality of robot arms according to various specific embodiments. As an example, robot device system 500 shows two robot arms. It is to be noted that robot device system 500 may have more than two robot arms.

According to various specific embodiments, robot device system 500 can have robot device system 100. Robot arm 120 of robot device 101 can be a first robot arm 120. In addition, robot device system 500 can have a second robot arm 520. Robot device system 500 shown in FIG. 5 and described as an example in the following is, as an illustration, an exemplary robot device 101 having a first robot arm 120 and a second robot arm 520. It is to be noted that the robot device can be any type of computer-controlled device having at least two manipulation devices for manipulating (e.g. moving, machining, processing, etc.) objects, such as a robot (e.g. a manufacturing robot, a maintenance robot, a household robot, a medical robot, etc.), a vehicle (e.g. an autonomous vehicle), a household device, a production machine, a personal assistant, an access control system, etc.

Second robot arm 520 can have robot limbs 502, 503, 504 and a base (or in general a holder) 505 by which robot limbs 502, 503, 504 are held. Control device 106 can be set up to realize the interaction with the environment according to a control program. For example, control device 106 can be set up to control first robot arm 120 and second robot arm 520. The last element 504 (seen from base 505) of robot limbs 502, 503, 504 is also designated end effector 504, and can contain one or more tools such as a grasping tool or a suction device (e.g. a suction head) or the like. Second robot arm 520 can contain connecting elements 507, 508, 509 that connect robot limbs 502, 503, 504 to one another and to base 505.

Second robot arm 520 can also be set up to pick up an object of the one or more objects 114. For each of first robot arm 120 and for second robot arm 520, robot control model 122 can have a trained robot control model 412 (see FIG. 4 and the associated description). The two trained robot control models 412 can each produce a third pickup prediction 418. Computer 110 can be set up to select robot arm 120, 520 and the third pickup robot configuration vector to which the highest third predicted success probability is assigned, and can produce corresponding control data 424 for controlling the selected robot arm according to the selected third pickup robot configuration vector.

Figure 6:
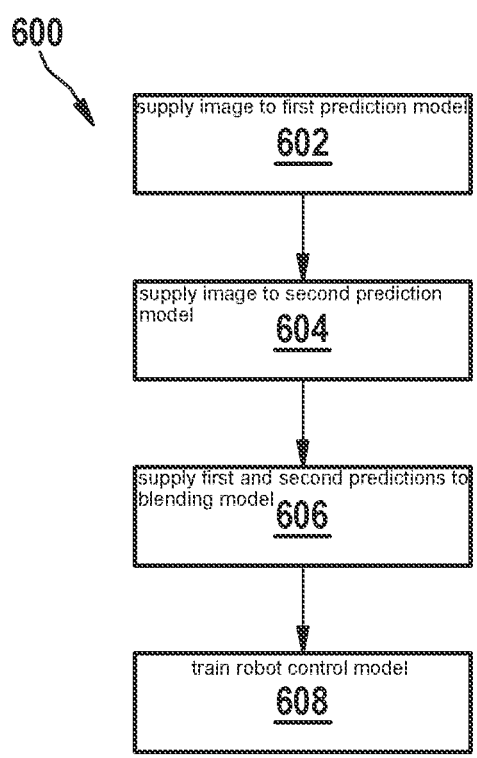
FIG. 6 shows a flow diagram for the computer-implemented training of a robot control model according to various specific example embodiments of the present invention.

FIG. 6 shows a flow diagram of a method 600 for the computer-implemented training of a robot control model according to various specific embodiments.

Method 600 can include (in 602) a supplying of an image, showing one or more objects, to a first prediction model of the robot control model in order to produce a first pickup prediction. For each pixel of the image, the first pickup prediction can include a respective first pickup robot configuration vector that describes a configuration of the robot device, with an assigned first predicted success probability.

Method 600 can include (in 604) a supplying of the image to a second prediction model of the robot control model in order to produce a second pickup prediction. For each pixel of the image, the second pickup prediction can have a respective second pickup robot configuration vector that describes a configuration of the robot device, with an assigned second predicted success probability.

Method 600 can include (in 606) a supplying of the first pickup prediction and the second pickup prediction to a blending model of the robot control model in order to produce a third pickup prediction. For each pixel of the image, the third pickup prediction can include: a third pickup robot configuration vector that is a combination, weighted by first weighting factors, of the first pickup robot configuration vector and the second pickup robot configuration vector, and a third predicted success probability, which is a combination, weighted by second weighting factors, of the first predicted success probability and the second predicted success probability.

Method 600 can include a training of the robot control model by adapting the first weighting factors and the second weighting factors on the basis of target data in which a successful picking up is assigned to at least one pixel of the image, in such a way that the robot control model for the at least one pixel the third predicted success probability is increased (in 608).

According to various specific embodiments, a method for controlling a robot device can include an acquiring of an image that shows one or more objects. In addition, the method can include a supplying of the image to a first prediction model of the robot control model in order to produce a first pickup prediction. For each pixel of the image, the first pickup prediction can include a respective first pickup robot configuration vector that describes a configuration of the robot device with an assigned first predicted success probability. In addition, the method can include a supplying of the image to a second prediction model of the robot control model in order to produce a second pickup prediction. For each pixel of the image, the second pickup prediction can include a respective second pickup robot configuration vector that describes a configuration of the robot device, with an assigned second predicted success probability. In addition, the method can include a supplying of the first pickup prediction and of the second pickup prediction to a blending model of the robot control model in order to produce a third pickup prediction. The third pickup prediction can include for each for each pixel of the image: a third pickup robot configuration vector that is a combination, weighted by first weighting factors, of the first pickup robot configuration vector and of the second pickup robot configuration vector, and a third predicted success probability that is a combination, weighted by second weighting factors, of the first predicted success probability and the second predicted success probability. In addition, the method can include, for the third pickup robot configuration vector of the third pickup prediction to which the highest third predicted success probability is assigned, a controlling of the robot device in order to pick up the object that the pixel assigned to the third pickup robot configuration vector indicates, according to the third pickup robot configuration vector.

What is claimed is:

1. A method for a computer-implemented training of a robot control model, set up to control a robot device for picking up an object of one or a plurality of objects, the method comprising the following steps:
supplying an image, which shows the one or more objects, to a first prediction model of the robot control model to produce a first pickup prediction that includes, for each pixel of the image, a respective first pickup robot configuration vector that describes a configuration of the robot device, with an associated first predicted success probability;

supplying the image to a second prediction model of the robot control model to produce a second pickup prediction, which includes, for each pixel of the image, a respective second pickup robot configuration vector that describes a configuration of the robot device, with an associated second predicted success probability;

supplying the first pickup prediction and the second pickup prediction to a blending model of the robot control model to produce a third pickup prediction, which, for each pixel of the image:

includes a third pickup robot configuration vector that is a combination, weighted by first weighting factors, of the first pickup robot configuration vector and the second pickup robot configuration vector, and includes a third predicted success probability that is a combination, weighted by second weighting factors, of the first predicted success probability and the second predicted success probability; and training the robot control model by adapting the first weighting factors and the second weighting factors based on target data in which a successful picking up is assigned to at least one pixel of the image, in such a way that the third predicted success probability produced for the at least one pixel is increased.

2. The method as recited in claim 1, wherein the first weighting factors include a weighting factor for all first pickup robot configurations and a weighting factor for all second pickup robot configurations.

3. The method as recited in claim 1, wherein the first weighting factors include a respective weighting factor for each first pickup robot configuration vector and a respective weighting factor for each second pickup robot configuration vector.

4. The method as recited in claim 1, wherein the second weighting factors include a weighting factor for all first predicted success probabilities and a weighting factor for all second predicted success probabilities.

5. The method as recited in claim 1, wherein the second weighting factors include a respective weighting factor for each first predicted success probability and a respective weighting factor for each second predicted success probability.

6. The method as recited in claim 1, wherein the robot control model includes a first convolutional neural network having the first weighting factors and a second convolutional neural network having the second weighting factors, and the production of the third pickup prediction including:

supplying the first pickup robot configurations and the second pickup robot configurations to the first convolutional neural network to produce the third pickup robot configurations, and supplying the first predicted success probabilities and the second predicted success probabilities to the second convolutional neural network to produce the third predicted success probabilities.

7. The method as recited in claim 1, further comprising:

producing a segmentation image by segmentation of the image, a plurality of pixels of the segmentation image being assigned to the one or more objects;

supplying the produced segmentation image to a first weighting model of the robot control model to produce the first weighting factors;

supplying the produced segmentation image to a second weighting model of the robot control model to produce the second weighting factors;

wherein the training of the robot control model by adapting the first weighting factors and the second weighting factors includes an adaptation of the first weighting model and of the second weighting model.

8. The method as recited in claim 1, further comprising:

for each surface depicted in the image, ascertaining a normal vector of the depicted surface and an associated standard deviation;

supplying the ascertained normal vectors and the associated standard deviations to a third weighting model of the robot control model to produce the first weighting factors;

supplying the ascertained normal vectors and the associated standard deviations to a fourth weighting model of the robot control model in order to produce the second weighting factors;

wherein the training of the robot control model by adapting the first weighting factors and the second weighting factors includes an adaptation of the third weighting model and of the fourth weighting model.

9. The method as recited in claim 1, wherein:

each pickup robot configuration vector is a tuple of values that describes a configuration of the robot device;

one or more values of a target tuple that describes a target pickup robot configuration is assigned to the at least one pixel in the target data;

the robot control model is trained in such a way that the robot control model produces, for the at least one pixel, a third pickup robot configuration vector whose tuple of values includes the one or more values of the target tuple, and the third predicted success probability assigned to the third pickup robot configuration vector is increased.

10. The method as recited in claim 1, wherein:

a failed picking up is assigned, in the target data, to at least one other pixel of the image, and the robot control model is trained, by adapting the first weighting factors and the second weighting factors, in such a way that the third predicted success probability produced for the at least one other pixel is reduced.

11. A method for controlling a robot device, the method comprising the following steps:

acquiring an image that shows one or more objects;

supplying the image to a trained robot control model, to produce a third pickup prediction, the robot control model being trained by:

supplying a first image, which shows one or more first objects, to a first prediction model of the robot control model to produce a first pickup prediction that includes, for each pixel of the image, a respective first pickup robot configuration vector that describes a configuration of the robot device, with an associated first predicted success probability, supplying the first image to a second prediction model of the robot control model to produce a second pickup prediction, which includes, for each pixel of the image, a respective second pickup robot configuration vector that describes a configuration of the robot device, with an associated second predicted success probability, supplying the first pickup prediction and the second pickup prediction to a blending model of the robot control model to produce the third pickup prediction, which, for each pixel of the image:

includes a third pickup robot configuration vector that is a combination, weighted by first weighting factors, of the first pickup robot configuration vector and the second pickup robot configuration vector, and includes a third predicted success probability that is a combination, weighted by second weighting factors, of the first predicted success probability and the second predicted success probability; and training the robot control model by adapting the first weighting factors and the second weighting factors based on target data in which a successful picking up is assigned to at least one pixel of the image, in such a way that the third predicted success probability produced for the at least one pixel is increased;

for the third pickup robot configuration vector of the third pickup prediction, to which vector a highest third predicted success probability is assigned, controlling the robot device to pick up the object, of the one or more objects, that is assigned to the pixel of the third pickup robot configuration vector, according to the third pickup robot configuration vector.

12. A non-transitory computer-readable medium on which is stored instructions for a computer-implemented training of a robot control model, set up to control a robot device for picking up an object of one or a plurality of objects, the instructions, when executed by a processor, causing the processor to perform the following steps:

supplying an image, which shows the one or more objects, to a first prediction model of the robot control model to produce a first pickup prediction that includes, for each pixel of the image, a respective first pickup robot configuration vector that describes a configuration of the robot device, with an associated first predicted success probability;

supplying the image to a second prediction model of the robot control model to produce a second pickup prediction, which includes, for each pixel of the image, a respective second pickup robot configuration vector that describes a configuration of the robot device, with an associated second predicted success probability;

supplying the first pickup prediction and the second pickup prediction to a blending model of the robot control model to produce a third pickup prediction, which, for each pixel of the image:

includes a third pickup robot configuration vector that is a combination, weighted by first weighting factors, of the first pickup robot configuration vector and the second pickup robot configuration vector, and includes a third predicted success probability that is a combination, weighted by second weighting factors, of the first predicted success probability and the second predicted success probability; and training the robot control model by adapting the first weighting factors and the second weighting factors based on target data in which a successful picking up is assigned to at least one pixel of the image, in such a way that the third predicted success probability produced for the at least one pixel is increased.

13. A training device, comprising:

a computer configured to train a robot control model, set up to control a robot device for picking up an object of one or a plurality of objects, the computer configured to:

supply an image, which shows the one or more objects, to a first prediction model of the robot control model to produce a first pickup prediction that includes, for each pixel of the image, a respective first pickup robot configuration vector that describes a configuration of the robot device, with an associated first predicted success probability;

supply the image to a second prediction model of the robot control model to produce a second pickup prediction, which includes, for each pixel of the image, a respective second pickup robot configuration vector that describes a configuration of the robot device, with an associated second predicted success probability;

supply the first pickup prediction and the second pickup prediction to a blending model of the robot control model to produce a third pickup prediction, which, for each pixel of the image:

includes a third pickup robot configuration vector that is a combination, weighted by first weighting factors, of the first pickup robot configuration vector and the second pickup robot configuration vector, and includes a third predicted success probability that is a combination, weighted by second weighting factors, of the first predicted success probability and the second predicted success probability; and train the robot control model by adapting the first weighting factors and the second weighting factors based on target data in which a successful picking up is assigned to at least one pixel of the image, in such a way that the third predicted success probability produced for the at least one pixel is increased.

14. A robot device, comprising:

at least one robot arm configured to pick up an object; and a control device configured to:

ascertain a third pickup prediction for an image that shows one or more objects, using a robot control model trained by:

supplying a first image, which shows one or more first objects, to a first prediction model of the robot control model to produce a first pickup prediction that includes, for each pixel of the image, a respective first pickup robot configuration vector that describes a configuration of the robot device, with an associated first predicted success probability, supplying the first image to a second prediction model of the robot control model to produce a second pickup prediction, which includes, for each pixel of the image, a respective second pickup robot configuration vector that describes a configuration of the robot device, with an associated second predicted success probability, supplying the first pickup prediction and the second pickup prediction to a blending model of the robot control model to produce the third pickup prediction, which, for each pixel of the image:

includes a third pickup robot configuration vector that is a combination, weighted by first weighting factors, of the first pickup robot configuration vector and the second pickup robot configuration vector, and includes a third predicted success probability that is a combination, weighted by second weighting factors, of the first predicted success probability and the second predicted success probability; and training the robot control model by adapting the first weighting factors and the second weighting factors based on target data in which a successful picking up is assigned to at least one pixel of the image, in such a way that the third predicted success probability produced for the at least one pixel is increased; and for the third pickup robot configuration vector of the third pickup prediction, to which vector the highest third predicted success probability is assigned, controlling the at least one robot arm to carry out the picking up of the object, of the one or more objects, that is assigned to the pixel of the third pickup robot configuration vector, according to the third pickup robot configuration vector.

* * * * *